US012342157B1

(12) United States Patent
Srinivasan et al.

(10) Patent No.: US 12,342,157 B1
(45) Date of Patent: Jun. 24, 2025

(54) SOCIAL AUDIO STREAMING

(71) Applicant: Meta Platforms, Inc., Menlo Park, CA (US)

(72) Inventors: Sriram Srinivasan, Sammamish, WA (US); Yuchen Huang, Sunnyvale, CA (US); Ajitesh Chandak, Mountain View, CA (US); Mykola Lando, Bellevue, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 318 days.

(21) Appl. No.: 18/051,243

(22) Filed: Oct. 31, 2022

(51) Int. Cl.
*H04S 7/00* (2006.01)
*G06F 3/0488* (2022.01)
*G06F 3/16* (2006.01)
*H04R 5/02* (2006.01)

(52) U.S. Cl.
CPC ............ *H04S 7/303* (2013.01); *G06F 3/0488* (2013.01); *G06F 3/165* (2013.01); *H04R 5/02* (2013.01)

(58) Field of Classification Search
CPC ........ H04S 7/303; G06F 3/0488; G06F 3/165; H04R 5/02

USPC ......................................................... 381/306
See application file for complete search history.

(56) References Cited

U.S. PATENT DOCUMENTS

2022/0103963 A1\* 3/2022 Satongar ................ H04N 7/147

\* cited by examiner

*Primary Examiner* — Vivian C Chin
*Assistant Examiner* — Douglas J Suthers
(74) *Attorney, Agent, or Firm* — Eversheds Sutherland (US) LLP (57) ABSTRACT

Systems and methods for social audio streaming may include (1) configuring, for a user participating in a media call with a group of additional users, a virtual visual surface that includes (i) an on-screen media call interface, presented within a viewable area of a display element of a device of the user, with a first set of user tiles, and (ii) an off-screen media call interface, positioned outside of the viewable area in a lateral direction relative to the viewable area, with a second set of user tiles and (2) spatializing an audio stream of an additional user, from the group of additional users, based on a position of the additional user's user tile within the virtual visual surface. Various other methods, systems, and computer-readable media are also disclosed.

20 Claims, 7 Drawing Sheets

SOCIAL AUDIO STREAMING

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Spatial audio may provide users with an immersive experience by mimicking how audio is perceived in real (non-digitally provided) life. The present disclosure identifies a need for a spatial audio framework within the context of social media calling (e.g., social audio conferencing and/or video conferencing). In some examples, the disclosed spatial audio framework may spatialize the audio stream of a participant in a media call based on a position of a user tile, corresponding to the participant, presented within an interface of the social media call. For example, the audio stream may be spatialized such that the audio stream is coming from a location that corresponds to a location of the user tile within the interface (e.g., an audio stream from a participant whose user tile is positioned on a left side of a media calling interface may be played via a left headphone speaker and/or a left stereo loudspeaker).

In some examples, the disclosed spatial audio framework may spatialize an audio stream based on a position of a user tile within a virtual plane. For example, in a media calling environment in which only a designated number of user tiles may be displayed within an on-screen media call interface, with surplus user tiles being presented within an off-screen interface (e.g., that may be surfaced in response to user navigation input), audio streams from off-screen user tiles may be given a position that corresponds to an off-screen position (e.g., an off-screen spatial location within the virtual plane). As a specific example, if left-to-right scrolling input is required to surface an off-screen interface on which a user tile is presented, an audio stream corresponding to the user tile may be given a left spatialization (e.g., may be played from a left headphone and/or a left stereo loudspeaker). Additionally or alternatively, the disclosed spatial audio framework may spatialize an audio stream based on a speaker designation. For example, a dominant speaker may be assigned a central audio spatialization (e.g., the dominant speaker's audio stream may be played simultaneously from both a left headphone and/or stereo speaker and a right headphone and/or stereo speaker).

As will be explained in greater detail below, embodiments of the present disclosure may improve the field of videotelephony by providing streaming spaces that spatialize user streams (e.g., based on a position of a user tile within a virtual plane). Embodiments may improve the functioning of a computer itself by improving a computer's audio spatialization capabilities. The following will provide, with reference to FIG. 1, detailed descriptions of computer-implemented methods for social audio streaming. Detailed descriptions of corresponding example systems will also be provided in connection with FIG. 2. Detailed descriptions of corresponding interfaces will be provided in connection with FIGS. 3-7.

Figure 1:
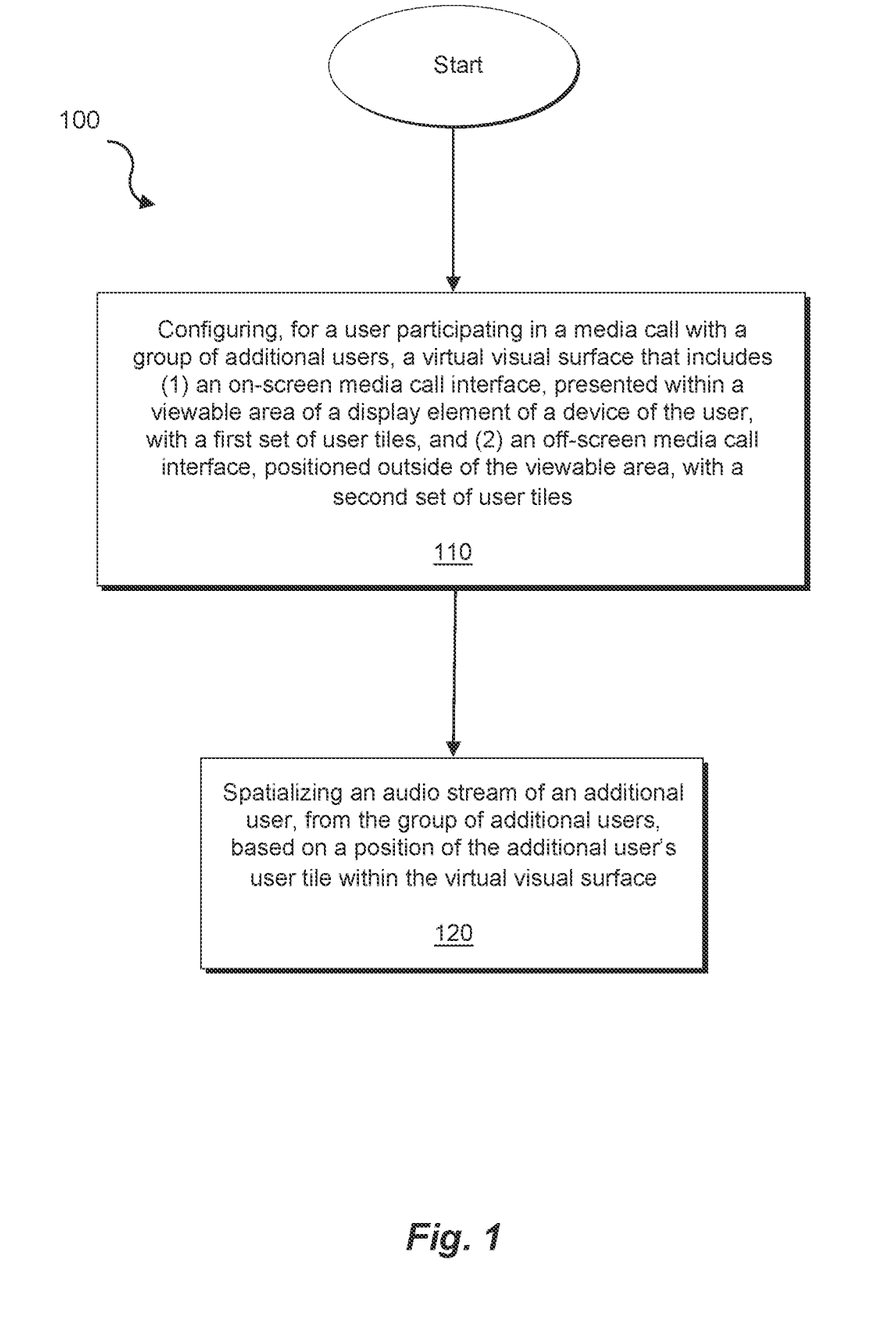
FIG. 1 is a flow diagram of an exemplary method for social audio streaming.

FIG. 1 is a flow diagram of an exemplary computer-implemented method 100 for social audio streaming. The steps shown in FIG. 1 may be performed by any suitable computer-executable code and/or computing system, including the system(s) illustrated in FIG. 2. For example, the steps shown in FIG. 1 may be performed by modules operating in a server 202 and/or modules operating in a user device 204 (e.g., as shown in exemplary system 200 in FIG. 2). In one example, each of the steps shown in FIG. 1 may represent an algorithm whose structure includes and/or is represented by multiple sub-steps, examples of which will be provided in greater detail below.

Server 202 generally represents any type or form of backend computing device that may perform one or more functions directed at digital social networking. In some examples, server 202 may operate in connection with a social media platform 206 (e.g., a social networking platform). Although illustrated as a single entity in FIG. 2, server 202 may include and/or represent a group of multiple servers that operate in conjunction with one another. User device 204 generally represents any type or form of computing device capable of reading computer-executable instructions. For example, user device 204 may represent a smart phone and/or a tablet. Additional examples of user device 204 may include, without limitation, a laptop, a desktop, a wearable device, a personal digital assistant (PDA), etc.

Figure 2:
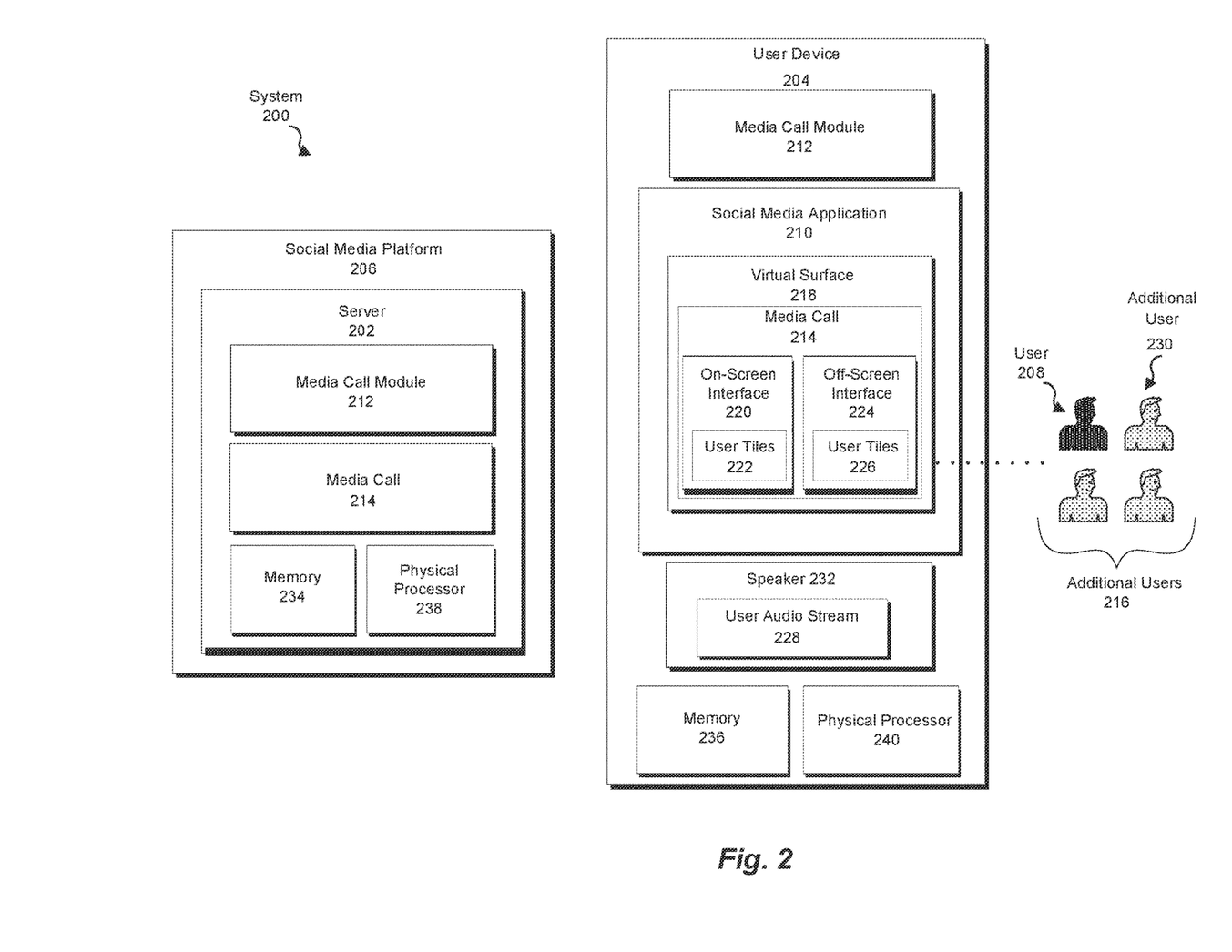
FIG. 2 is a block diagram of an exemplary system for social audio streaming.

In some examples, a user 208 of user device 204 may be a member of social media platform 206. In these examples, user device 204 may have installed an instance of a social media application 210, which may operate as part of social media platform 206 and through which one or more services provided by server 202 may be accessible. Additionally or alternatively, user device 204 may have installed a browser that may navigate to one or more webpages maintained by social media platform 206, through which one or more services provided by server 202 may also be accessible.

Social media platform 206 may provide a variety of services for the users within its digital social network (e.g., via server 202). In one example, social media platform 206 may provide a newsfeed service. The term "newsfeed" may generally refer to any type or form of social media consumption channel that presents a scrollable collection of newsfeed posts within a newsfeed interface. In some examples, a newsfeed may scroll (e.g., upward or downward) to reveal different posts within the newsfeed, in response to receiving user scrolling input. In one example, the scrollable collection may include a collection of newsfeed posts created by contacts of a particular user (e.g., friends of the particular user). The term "newsfeed post" generally refers to any type or form of digital composition that may be displayed in a newsfeed. Newsfeed posts may include, without limitation, text-based compositions, media-based compositions (which may include either a single media item or a collage of multiple media items), and/or a link to an online article. The newsfeed service may enable viewers of a newsfeed post to comment on the post, via a text and/or image-based reply, creating a digital thread of comments.

As another example, social media platform 206 may provide a digital story service. The digital story service may provide users with a story consumption channel, which presents a continuous series of digital story posts to a story-consumer, one by one. The term "digital story post" may generally refer to any type or form of social media post intended for a story consumption channel. A digital story composition may include a variety of content (e.g., a digital photograph, a graphic, text, a digital video and/or a digital recording of a music composition). In one example, the story consumption channel may transition from presenting one digital story post to the next automatically, without requiring any user input to do so. In some examples, digital story posts from a same source (e.g., created and/or posted by a same user) may be grouped together within the story consumption channel, such that each digital story post from a particular source is displayed prior to displaying digital story posts from another source. In one embodiment, a digital story post may be ephemeral. That is, the digital story post may only be viewable for a predetermined amount of time. For example, a digital story composition may be set to disappear after twenty-four hours. Similar to the newsfeed service, the digital story service may enable viewers of a story post to comment on the post, via a text and/or image-based reply and/or reply story, creating a digital thread of comments.

As another example, social media platform 206 may provide a messaging service. The term "messaging service" may generally refer to any type or form of digital message delivery system that enables users of social media platform 206 to exchange messages (e.g., text messages and/or group chats) within a private message thread. These messages may include a variety of content (e.g., a text, link, live video, voice recordings, etc.).

In some examples, as discussed throughout the present disclosure, social media platform 206 may provide a media call service (e.g., audio conferencing and/or video conferencing service). In these examples, the media call service may operate as a stand-alone service and/or may be integrated with another service (e.g., a messaging service, a newsfeed service, a digital story service, etc.).

The term "media call service" refers to any type or form of media streaming and/or videotelephony service that enables the digital transmission and/or sharing of real-time media streams (e.g., user video streams and/or user audio streams), from one endpoint or multiple endpoints, via a media conferencing interface. The term "real-time video stream" generally refers to any type or form of multimedia that is transmitted in real time, as a series of frames, from an endpoint (i.e., transmitting device) to one or more additional endpoints. Each frame may be displayed by an endpoint (to a user) as the frame is received (e.g., without waiting for the entire series of frames to be received). Similarly, a "real-time audio stream" may refer to any type or form of real-time audio delivery to an endpoint through a network connection that is transmitted as the audio is received.

In some examples, social media platform 206 may host media calls within digital media rooms (e.g., digital video rooms and/or digital audio rooms) maintained by social media platform 206. In some such examples, a digital media room may be created in response to user input initiating the creation of the digital media room (e.g., user input to a media room digest interface and/or a dedicated media room creation interface). In examples in which the media call service operates as part of a supplemental service integrated with a primary service, such user input may be received via an interface of the primary service (e.g., via a creation element displayed within a group chat interface and/or a newsfeed interface). In one embodiment, a creation element may be associated with a group (e.g., may be displayed within a group chat interface) and a resulting digital media room may automatically be configured to include, as members of the digital media room, the members of the associated group.

In addition, or as an alternative, to creating a digital media room in response to a direct user request, the disclosed media call service may create a digital media room automatically in response to a computer-detectable event. For example, a creation module may automatically create a digital media room for a group of users in response to determining that the users have formed a digital association (e.g., a group) via a service of social media platform 206. In some examples, the creation module may automatically create a digital media room for each digital thread created and/or maintained via social media platform 206, automatically configuring a digital media room with a membership that includes and/or consists of the members and/or participants of its corresponding digital thread. The term "digital thread" may refer to any series of related digital exchanges (e.g., a thread of messages in a group chat and/or a group text and/or a thread of comments responding to a digital social media post).

Figures 3A, 3B:
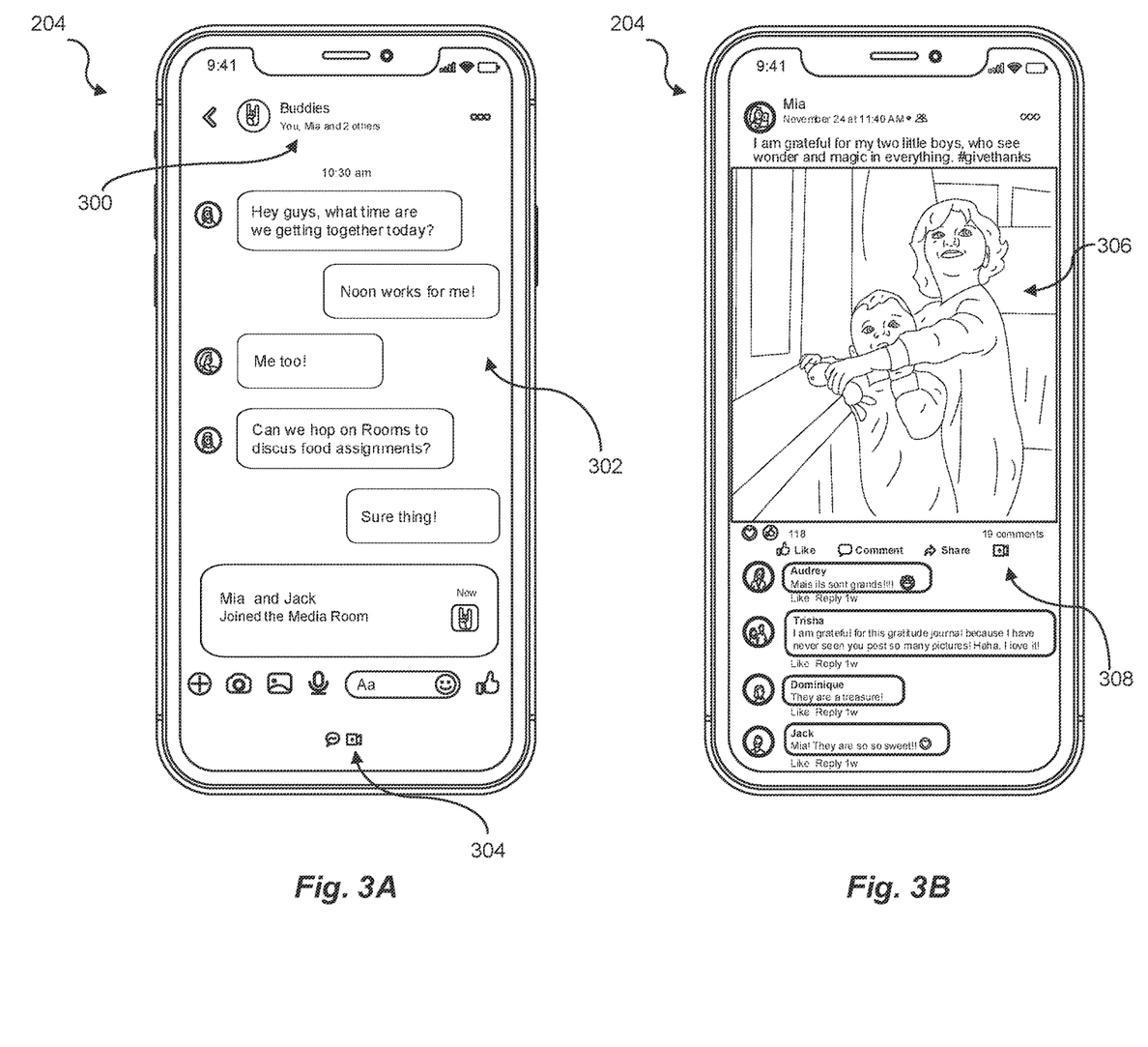
FIGS. 3A-3B are illustrations of exemplary digital messaging threads for which a corresponding media conferencing room may be created.

FIG. 3A illustrates an exemplary embodiment of a digital thread of messages between users, within a group 300, displayed in a group chat interface 302. Using FIG. 3A as a specific example, a creation module operating in connection with social media platform 206 (e.g., operating within server 202) may automatically create a digital media room, with the members of the group chat depicted in FIG. 3A as participants, in response to identifying the group chat (e.g., in response to the creation of the group chat) and/or in response to receiving user input to a video room element 304. FIG. 3B illustrates an exemplary embodiment of a digital thread of comments to a social media post 306 posted by a group of users. In this embodiment, a creation module may automatically create a digital media room, with the users who have commented on social media post 306 as participants, in response to identifying the comments thread and/or in response to receiving user input to a video room element 308.

In some embodiments in which a digital media room corresponds to a digital thread, a creation module may automatically update the membership of the digital media room to continually coincide with the membership of the digital thread (e.g., in response to identifying a change in the membership of the digital thread). In some examples in which a digital media room corresponds to a digital social media thread, a creation module and/or a media room module may maintain the digital media room as long as the digital thread is active (e.g., until and/or unless the digital thread is deleted).

In addition, or as an alternative, to automatically creating a digital media room to correspond to a digital thread, the disclosed media call service may automatically create a digital media room to correspond to other digital groups and/or group-based content. For example, a creation module (e.g., operating within server 202) may automatically create a digital media room to correspond to a group social media composition (e.g., with contributors to the composition as participants to the digital media room), a group digital story (e.g., with contributors to the group digital story as participants to the digital media room), a group photo album (e.g., with contributors and/or users with access rights to the album as participants to the digital media room), and/or a group videogame (e.g., with participants to the videogame as participants to the digital media room). In such examples, the creation module may also automatically update the membership of the digital media room based on a change in membership of the associated group and/or group content and/or may maintain a digital video room as long as the associated group and/or group content is active.

Figure 4:
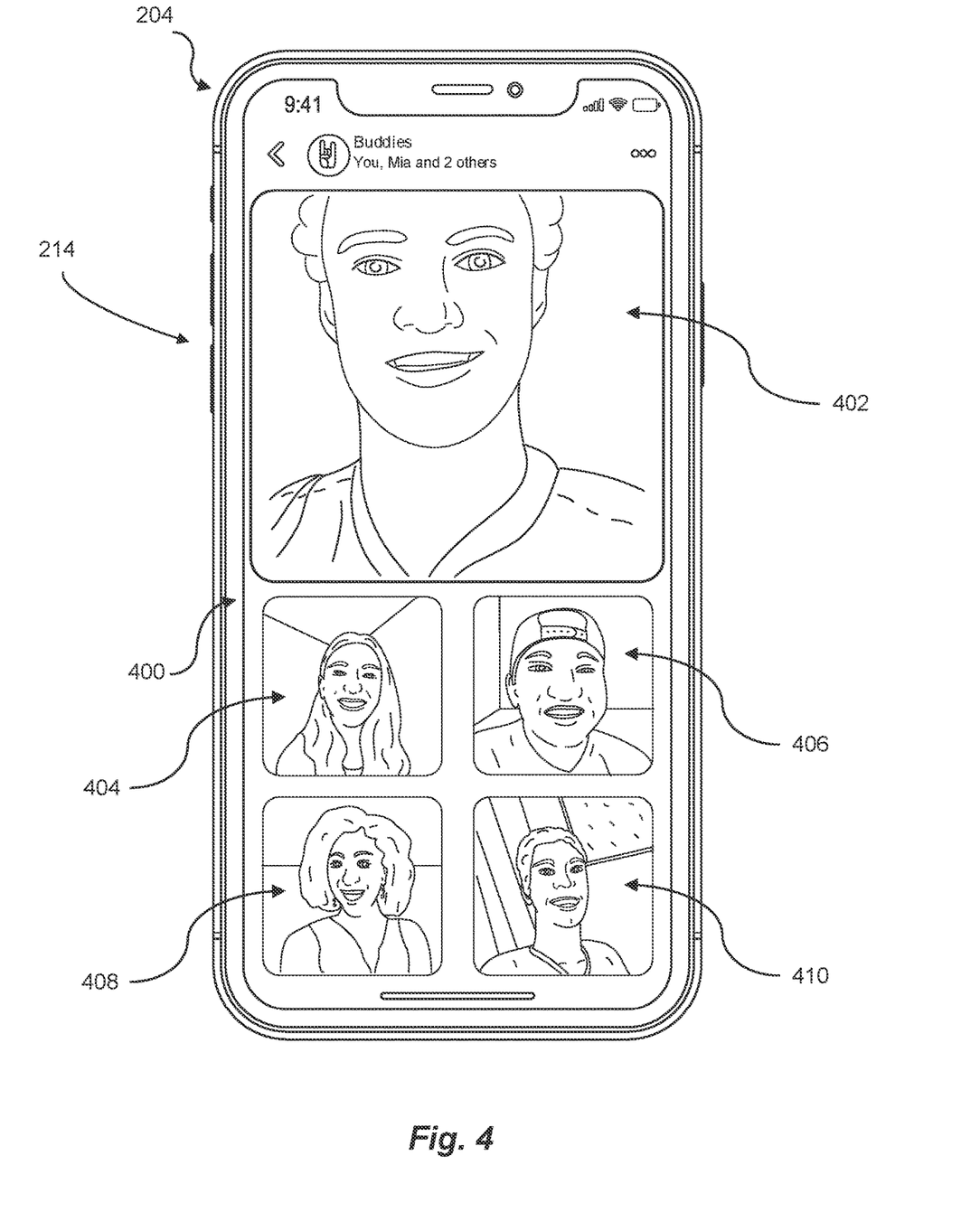
FIG. 4 is an illustration of an exemplary primary media call interface.

FIG. 4 depicts an exemplary embodiment of an interface 400 for a media call (e.g., hosted by the disclosed media call service). An interface for a media call may be presented in a variety of configurations (e.g., as depicted in these figures). FIG. 4 depicts a media call interface for a media call that presents a set of user tiles (i.e., user tiles 402, 404, 406, 408, and 410). In FIG. 4, user tile 402, which is larger than the other user tiles of interface 400, presents a video stream of a participating user designated as a dominant speaker.

Figure 5:
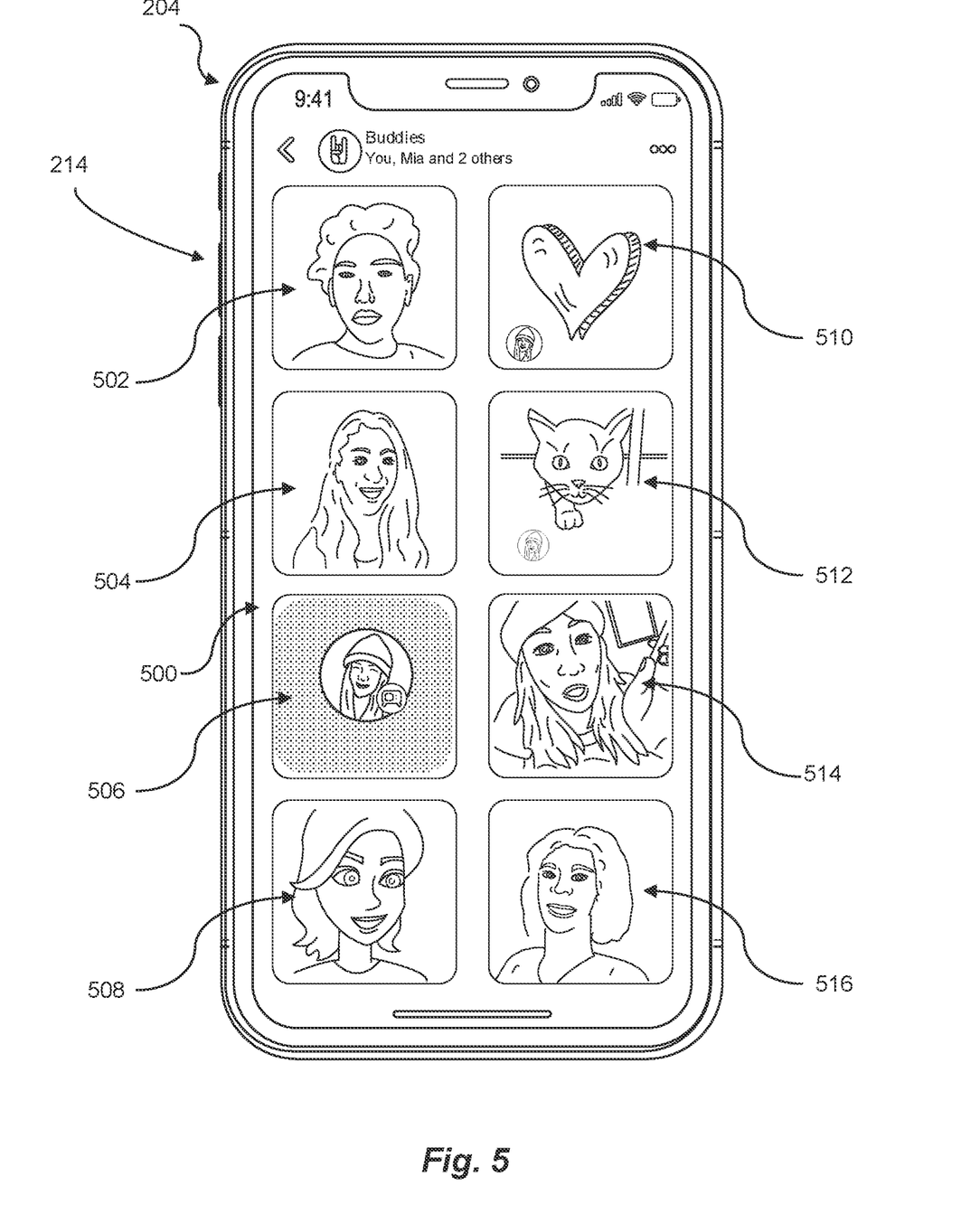
FIG. 5 is an illustration of an exemplary secondary media call interface.
Figure 6:
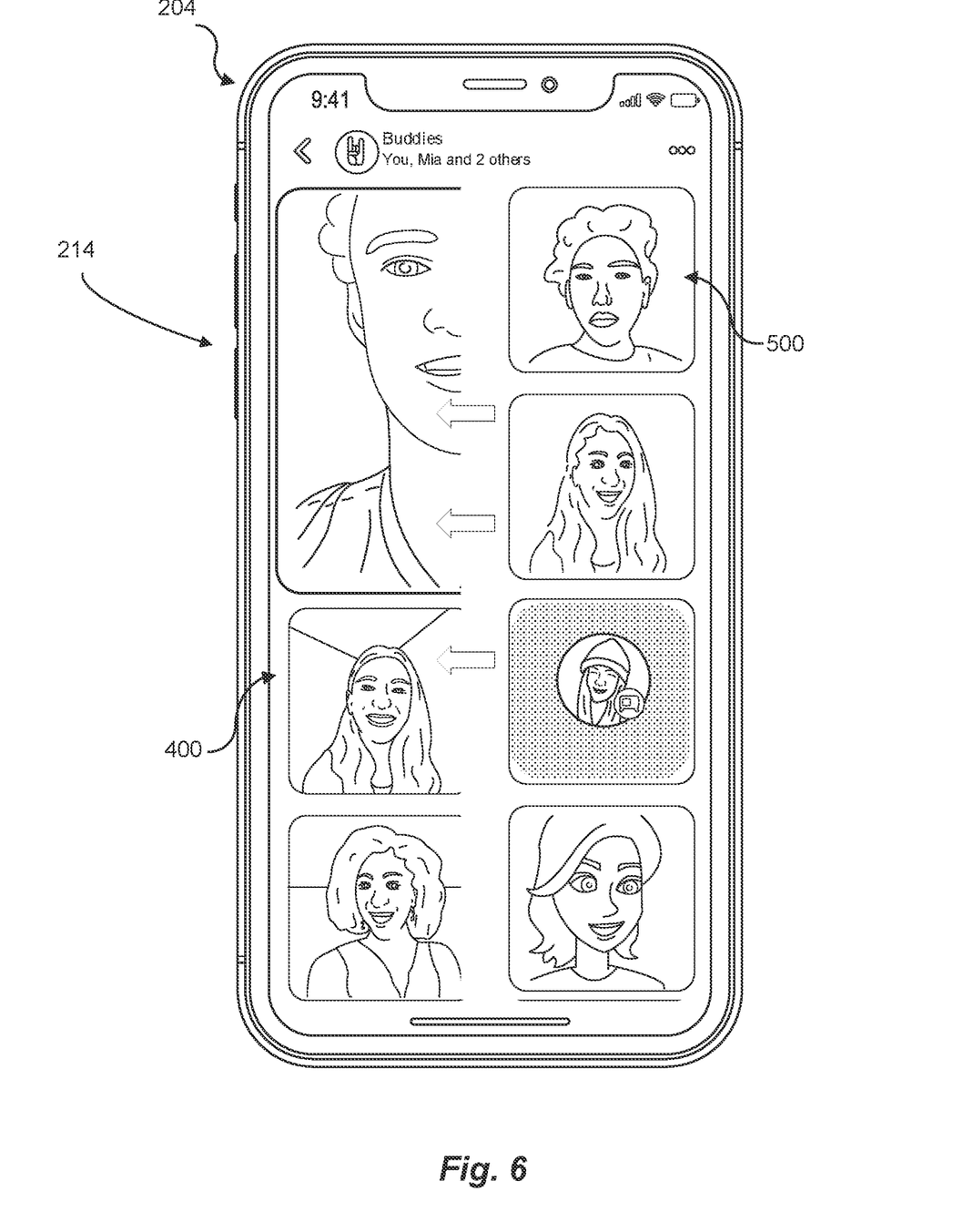
FIG. 6 is an exemplary illustration of a display element transitioning from presenting the interface of FIG. 4 to presenting the interface of FIG. 5.

In some examples, a media call may be visually represented by a virtual surface that includes two or more interfaces, a subset (e.g., one) of which may be presented within a viewable area of a display element of user device 204 and the others of which may be maintained off-screen. In these examples, user 208 may toggle between which interface is being presented within the viewable area (e.g., via user swiping input). In response to receiving user input to change which interface is presented within the viewable area, an off-screen interface may replace a currently presented interface (i.e., the current on-screen interface) and become the new on-screen interface. FIG. 5 depicts a second interface (interface 500) within the same virtual surface (i.e., for the same media call) as interface 400 depicted in FIG. 4. Interface 500 presents a second set of user tiles (i.e., 502, 504, 506, 508, 510, 512, 514, and 516). FIG. 6 presents the viewable area of user device 204 transitioning from displaying interface 400 to displaying interface 500 (e.g., in response to receiving user horizontal swiping input).

In one embodiment, the interfaces of a media call's virtual surface may include a primary interface (e.g., which may include a dominant speaker) and an overflow interface. In the media call depicted in FIGS. 4-6, FIG. 4 may represent a primary interface (with user tile 402 corresponding to a dominant speaker) and FIG. 5 may represent an overflow interface. In some such embodiments, the primary interface may be automatically presented to a user when the user joins a media call and the overflow interface may be presented in response to receiving user navigation input requesting to change which media call interface is presented within the viewable area of a display element of the user's device.

The user tiles, presented within an interface of a virtual surface for a media call, may present a variety of content. Such content may include, without limitation, a video stream of a user, a profile picture of a user, an avatar of a user, a still image from a user, an audio graphic of a user, etc. (e.g., as depicted in FIGS. 4-5). In addition to presenting a user tile for a user, the disclosed media call service may stream an audio stream for a user. As will be described in greater detail below in connection with steps 110-120, the audio stream for a user may be spatialized (e.g., based on a spatial placement of the user's user tile and/or a designation of the user within the media call).

Figure 7:
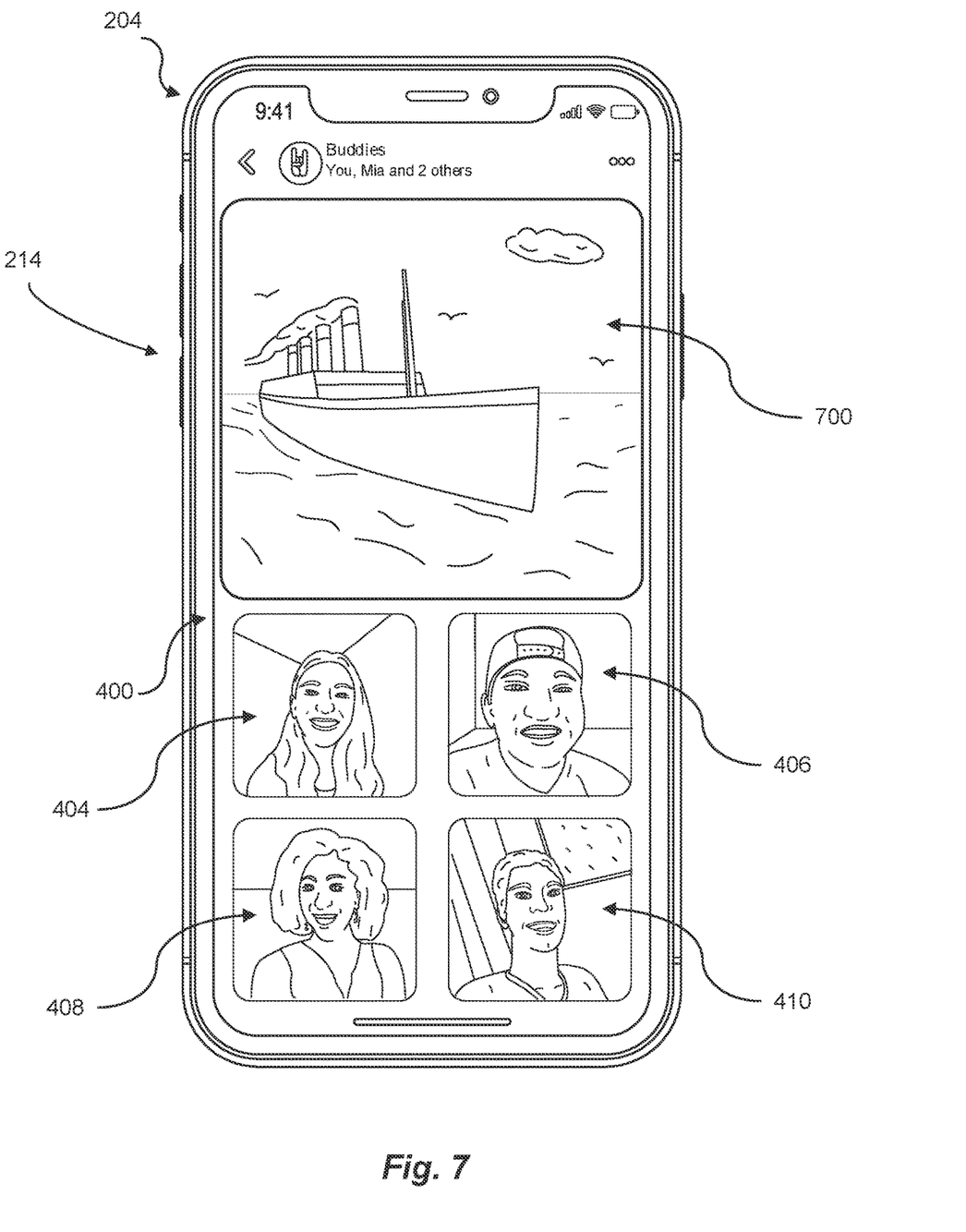
FIG. 7 is an illustration of an exemplary media call interface streaming group content.

In some examples, a media call hosted by the disclosed media call service may stream group content, such as a digital film (e.g., in addition to streaming user video streams and/or user audio streams). FIG. 7 depicts an interface of a media call with group content (e.g., taking the place of a dominant speaker within the media call).

Returning to FIG. 1, at step 110, one or more of the systems described herein may configure, for a user participating in a media call with a group of additional users, a virtual visual surface that includes (1) an on-screen media call interface, presented within a viewable area of a display element of a device of the user, that presents a first set of user tiles, and (2) an off-screen media call interface, positioned outside of the viewable area of the display element, that presents a second set of user tiles (with each user tile within the first and second set of user tiles corresponding to a different additional user within the group of additional users). For example, as illustrated in FIG. 2, a media call module 212 may configure, for user 208 participating in a media call 214 with a group of additional users 216, a virtual surface 218 that includes (1) an on-screen interface 220, with a first set of user tiles 222, and (2) an off-screen interface 224, with a second set of user tiles 226.

The term "media call" may refer to any type or form of computer-mediated session in which multimedia from an endpoint, participating in the session, is transmitted in real time to one or more additional endpoints participating in the session. In some examples, the media call may include the transmission of real-time user video streams and/or real-time user audio streams. In one embodiment, each participating user may be enabled to contribute an audio and/or video stream. In other embodiments, only a subset of users may be enabled to contribute an audio and/or video stream. Media call 214 may be hosted by a variety of services (e.g., such as the media call service described above in connection with FIGS. 2-7) and may include a variety of features (e.g., such as the features described above in connection with FIGS. 2-7).

Media call module 212 may operate in a variety of contexts. In some examples, media call module 212 may operate as part of a video conferencing service, an audio conferencing service, and/or a videotelephony service. Additionally or alternatively, media call module 212 may operate as part of a platform (e.g., social media platform 206) that provides video conferencing and/or audio conferencing as a standalone service and/or as a supplemental service integrated with another service of the platform (e.g., integrated with a messaging service, a newsfeed service, a digital story service, a photo-sharing service, etc.).

Virtual surface 218 represents any type or form of virtual structure configured for a media call that includes two or more media call interfaces. In some examples, only a subset of the interfaces of virtual surface 218 (e.g., one interface of virtual surface 218) may be presented at a time within a display element of user device 204. The other (off-screen) media call interfaces of virtual surface 218 may be positioned outside of the viewable area. In these examples, which of the interfaces of virtual surface 218 is presented within the display element (as an on-screen interface) may be changed via user navigation input (e.g., user scrolling input and/or a user selection of a digital toggle element). In some examples, an off-screen media call interface may be positioned outside of a viewable area in a lateral direction relative to an on-screen media call interface (e.g., to the left or to the right of an on-screen media call interface). In some such examples, user swiping input (e.g., starting in the lateral direction of an off-screen media call interface and moving in the opposite direction of the lateral direction) may move a current on-screen media call interface out of viewable area, such that the current on-screen media call interface becomes an off-screen interface, and move the off-screen media call interface into the viewable area (e.g., moving from the lateral direction into the viewable area) such that the off-screen media call interface becomes the new on-screen media call interface.

FIGS. 4-5 provide an exemplary depiction of virtual surface 218 for media call 214 in which virtual surface 218 includes a primary interface (interface 400 in FIG. 4) with a first set of user tiles (i.e., tiles 402, 404, 406, 408, and 410) and an overflow interface (interface 500 in FIG. 5) with a second set of user tiles (i.e., 502, 504, 506, 508, 510, 512, 514, and 516). FIG. 6 depicts a transition in which an off-screen interface (interface 500), positioned to the right of a current on-screen interface (interface 400), moves from right to left until it takes the place of the current on-screen interface (interface 400), becoming the new on-screen media call interface.

Returning to FIG. 1, at step 120, one or more of the systems described herein may spatialize an audio stream of an additional user, from the group of additional users, based on a position of the additional user's user tile within the virtual visual surface. For example, as illustrated in FIG. 2, medical call module 212 may spatialize an audio stream 228 of an additional user 230, based on a position of additional user 230's user tile within virtual surface 218.

Media call module 212 may spatialize audio stream 228 in a variety of ways. In some examples, media call module 212 may spatialize audio stream 228 by (1) identifying the position of additional user 230's user tile within virtual surface 218 and (2) streaming additional user 230's audio stream (audio stream 228) via a speaker (e.g., speaker 232 in FIG. 2) with a spatial assignment that corresponds to the identified position.

Media call module 212 may identify the position of additional user 230's user tile within virtual surface 218 in a variety of ways. In some embodiments, media call module 212 may determine (1) that additional user 230's user tile is assigned to an off-screen interface (e.g., off-screen interface 224) and (2) that the off-screen interface is positioned outside of the viewable area of a display element of user device 204 in a lateral direction relative to the viewable area (e.g., to the left of the viewable area or to the right of the viewable area). In these examples, media call module 212 may identify the lateral direction of the off-screen interface (e.g., left or right) as the position of additional user 230's user tile within virtual surface 218.

As a specific example of identifying a user tile position based on the position of an off-screen interface, media call module 212 may determine that off-screen interface 224 is logically positioned to the right of on-screen interface 220 (e.g., such that right-to-left swiping input and/or input to a change-screen element, located on a right side of on-screen interface 220, is configured to move on-screen interface 220 out of the viewable area of a display element of user device 204 and move off-screen interface 224 into the viewable area). In this specific example, media call module 212 may determine that additional user 230's user tile is in a right position (e.g., in response to determining that the user tile is positioned within an off-screen interface that is positioned to the right of an on-screen interface).

As another specific example, media call module 212 may determine that off-screen interface 224 is logically positioned to the left of on-screen interface 220 (e.g., such that left-to-right swiping input and/or input to a change-screen element, located on a left side of on-screen interface 220, is configured to move on-screen interface 220 out of the viewable area of the display element of user device 204 and move off-screen interface 224 into the viewable area). In this specific example, media call module 212 may determine that additional user 230's user tile is in a left position (e.g., in response to determining that the user tile is positioned within an off-screen interface that is positioned to the left of an on-screen interface).

In embodiments in which media call module 212 determines (1) that additional user 230's user tile is assigned to an off-screen interface and (2) that the off-screen interface is positioned outside of a viewable area in a lateral direction, media call module 212 may stream additional user 230's audio stream 228 via a speaker (e.g., speaker 232) with a spatial assignment that corresponds to the lateral direction of the off-screen interface. For example, in examples in which (1) additional user 230's user tile is placed on off-screen interface 224 and (2) off-screen interface 224 is positioned to the left of on-screen interface 220, speaker 232 may represent a left speaker. As another example, in examples in which (1) additional user 230's user tile is placed on off-screen interface 224 and (2) off-screen interface 224 is positioned to the right of on-screen interface 220, speaker 232 may represent a right speaker.

The term "right speaker" refers generally to any speaker that has been assigned (e.g., by a manufacturer of the speaker and/or an installer of the speaker) a "right" position. Examples of a right speaker can include, without limitation, a right headphone speaker, a speaker built into a right side of a user device, and/or a speaker (e.g., within a surround sound system configured to play audio streams for media call 214) assigned to a right side of a room. Conversely, the term "left speaker" refers generally to any speaker that has been assigned a "left" position (e.g., a left headphone speaker, a speaker built into a left side of a user device, and/or a speaker assigned to a left side of a room).

In some embodiments in which media call module 212 determines (1) that additional user 230's user tile is assigned to off-screen interface 224 and (2) that off-screen interface 224 is positioned outside of the viewable area (of the display element of user device 204) in a lateral direction, after streaming additional user 230's audio stream 228 via speaker 232 (i.e., a speaker with a spatial assignment that corresponds to the lateral direction of off-screen interface 224), media call module 212 may receive user navigation input (e.g., submitted by user 208 to on-screen interface 220) to view off-screen interface 224 within the viewable area in place of viewing on-screen interface 220 within the viewable area.

Media call module 212 may receive the user navigation input in a variety of ways. In examples in which media call module 212 operates within a backend server (i.e., server 202), media call module 212 may receive an indication of the user navigation input from user device 204. Additionally or alternatively, in examples in which media call module 212 operates within user device 204, media call module 212 may receive the user navigation input directly (e.g., via tapping input to a screen of user device 204, input to an auxiliary device such as a digital mouse, etc.). In some examples, the user navigation input may represent user swiping input (e.g., input swiping on-screen interface 220 out of the viewable area and off-screen interface 224 into the viewable area).

In response to receiving the user navigation input just described, media call module 212 may move off-screen interface 224 from the lateral direction into the viewable area and move on-screen interface 220 outside the viewable area (e.g., in an opposite lateral direction), such that off-screen interface 224 becomes a new on-screen media call interface and on-screen interface 220 becomes a new off-screen media call interface. Additionally, media call module 212 may update the spatialization of additional user 230's audio stream. For example, media call module 212 may change from (1) streaming additional user 230's audio stream 228 via speaker 232 (with the spatial assignment that corresponds to the lateral direction of off-screen interface 224) to (2) streaming additional user 230's audio stream 228 based on a position of additional user 230's user tile within the new on-screen media call interface (e.g., streaming audio stream 228 to a speaker with a spatial assignment that corresponds to the position of additional user 230's user tile within the new on-screen media call interface).

In some examples, the position of additional user 230's user tile within the new on-screen media call interface may represent a lateral position (e.g., a left position or a right position) and the speaker that corresponds to the position within the new on-screen media call interface may represent a left speaker (in examples in which the lateral position is a position on a left side of the interface) or a right speaker (in examples in which the lateral position is a position on a right side of the interface).

Turning to FIGS. 4-5 as a specific example, media call module 212 may, after presenting interface 400 within the viewable area of display element of user device 204, receive user navigation input to interface 400 (e.g., swiping input from right to left or from left to right across a touchscreen of user device 204) requesting to move interface 400 out of the view and move interface 500 into the view. In response, media call module 212 may present interface 500 within the view of the display element in place of presenting interface 400. Prior to the move, a user tile 502 of an additional user, included within interface 500, may be positioned off-screen. While off-screen, an audio stream of the additional user may be played via a speaker that corresponds to the position of interface 500 relative to interface 400. For example, if interface 500 is logically located to the right of interface 400 (e.g., such that swiping input from right to left brings interface 500 into view), the audio stream of the additional user may be played via a right speaker. After the move, user tile 502 may be positioned within the viewable area of the display element (i.e., on-screen). Once on-screen, the audio stream of the additional user may be played via a speaker that corresponds to the position of user tile 502 relative to other user tiles within interface 500. For example, if user tile 502 is positioned on the left side of interface 500 (as depicted in FIG. 5), media call module 212 may stream the additional user's audio stream via a left speaker.

In addition or as an alternative to spatializing an audio stream based on a position of a user tile, in some embodiments, media call module 212 may spatialize an audio stream based on a designation of a user participating in media call 214. For example, media call module 212 may detect a dominant speaker from additional users 216 and, in response, stream an audio stream of the dominant speaker via a speaker corresponding to a central position. In some examples (e.g., in configurations in which audio from media call 214 is being streamed via an audio system with only two speakers-a left speaker and a right speaker), the speaker corresponding to a central position may represent multiple speakers (e.g., both a left speaker and a right speaker). A user may be designated as a dominant speaker based on a variety of metrics. In some examples, a dominant speaker may represent a user that satisfies a talking metric (e.g., a user who is talking the most and/or the loudest). In one embodiment, a dominant speaker may represent a host of a media call and/or a user designated as the dominant speaker via user input. FIG. 4 depicts an embodiment in which a video stream of a dominant user is presented within user tile 402.

As another example of an audio stream being spatialized based on a designation associated with the audio stream, in examples in which group content is streamed within virtual surface 218, an audio stream of the group content may be spatialized based on its designation as group content. For example, the audio stream of group content may be streamed via a speaker corresponding to a central position (e.g., similar to the dominant speaker embodiment just described). FIG. 7 depicts an embodiment in which a video stream of group content is presented within a group content tile 700, whose corresponding audio stream may be streamed via a speaker (e.g., a set of speakers) corresponding to a central position.

In some examples, user device 204 may represent a device with multiple display elements (and/or a device communicatively coupled to one or more additional display elements) and media call 214 may include multiple interfaces such that (1) a first display element of user device 204 displays a first interface and (2) a second display element of user device 204 presents a second interface. In these, media call module 212 may spatialize the audio stream corresponding to a user tile presented in the first or second interface based on (1) the user tile's tiles position within the interface in which the user tile is presented and/or (2) the position of the interface, in which the user tile is presented, relative to the other displayed interface.

In some examples, an audio system configured to play the audio streams of media call 214 may represent a stereo system and the speakers of the stereo system may consist of only two speakers: a left speaker and a right speaker. In some such examples, the position of a user's user tile within virtual surface 218 may be binarily assigned (e.g., as a left position or a right position) and/or the position may be given one of three assignations (e.g., a left position, a central position, or a right position). In other examples, an audio system configured to play the audio streams of media call 214 (e.g., a surround sound audio system) may include three or more speakers. In some such examples, the position of a user's user tile within virtual surface 218 may be assigned a variety of positions based on the factors described above.

EXAMPLE EMBODIMENTS

Example 1: A computer-implemented method may include (1) configuring, for a user participating in a media call with a group of additional users, a virtual visual surface that includes (i) an on-screen media call interface, presented within a viewable area of a display element of a device of the user, that includes a first set of user tiles, and (ii) an off-screen media call interface, positioned outside of the viewable area, that includes a second set of user tiles, where each user tile within the first and second set of user tiles corresponds to a different additional user within the plurality of additional users and (2) spatializing an audio stream of an additional user, from the group of additional users, based on a position of the additional user's user tile within the virtual visual surface.

Example 2: The computer-implemented method of example 1, where spatializing the additional user's audio stream based on the position of the additional user's user tile within the virtual visual surface includes (1) identifying the position of the additional user's user tile within the virtual visual surface and (2) streaming the additional user's audio stream via a speaker with a spatial assignment that corresponds to the identified position.

Example 3: The computer-implemented method of example 2, where (1) the off-screen media call interface is positioned outside of the viewable area in a lateral direction relative to the viewable area, (2) identifying the position of the additional user's user tile within the virtual visual surface includes determining that the additional user's user tile is assigned to the off-screen media call interface, and (3) streaming the additional user's audio stream via the speaker with the spatial assignment that corresponds to the identified position includes streaming the additional user's audio stream via a speaker with a spatial assignment that corresponds to the lateral direction of the off-screen media call interface.

Example 4: The computer-implemented method of example 3, where the lateral direction of the off-screen media call interface comprises a left direction.

Example 5: The computer-implemented method of example 4, where the speaker with the spatial assignment that corresponds to the lateral direction of the off-screen media call interface represents a left headphone speaker, a speaker built into a left side of the user's device, and/or a speaker assigned to a left side of a room.

Example 6: The computer-implemented method of examples 3-5, where the lateral direction of the off-screen media call interface is a right direction.

Example 7: The computer-implemented method of example 6, where the speaker with the spatial assignment that corresponds to the lateral direction of the off-screen media call interface is a right headphone speaker, a speaker built into a right side of the user's device, and/or a speaker assigned to a right side of a room.

Example 8: The computer-implemented method of examples 3-7, where the method further includes receiving user input to view the off-screen media call interface within the viewable area in place of viewing the on-screen media call interface within the viewable area and in response to receiving the user input (1) moving the off-screen media call interface from the lateral direction into the viewable area and moving the on-screen media call interface outside the viewable area in an opposite lateral direction, such that the off-screen media call interface becomes the new on-screen media call interface and the on-screen media call interface becomes a new off-screen media call interface and (2) changing from (i) streaming the additional user's audio stream via the speaker with the spatial assignment that corresponds to the lateral direction of the off-screen media call interface to (ii) streaming the additional user's audio stream based on a position of the additional user's user tile within the new on-screen media call interface.

Example 9: The computer-implemented method of example 8, where streaming the additional user's audio stream based on the position of the additional user's user tile within the new on-screen media call interface includes streaming the additional user's audio stream via a speaker with a spatial assignment that corresponds to the position of the additional user's user tile within the new on-screen media call interface.

Example 10: The computer-implemented method of example 9, where (1) the position of the additional user's user tile within the new on-screen media call interface is a lateral position within the new on-screen media call interface and (2) the speaker, with the spatial assignment that corresponds to the position of the additional user's user tile within the new on-screen media call interface, has a spatial assignment that corresponds to the lateral position within the new on-screen media call interface.

Example 11: The computer-implemented method of examples 8-10, where the user input is lateral user swiping input.

Example 12: The computer-implemented method of examples 1-11, where the method further includes (1) detecting a dominant speaker from the group of additional users and (2) in response to detecting the dominant speaker, streaming an audio stream of the dominant speaker via a speaker corresponding to a central position.

Example 13: The computer-implemented method of example 12, where streaming the dominant speaker's audio stream via the speaker corresponding to the central position includes simultaneously streaming the dominant speaker's audio stream via a left speaker and a right speaker.

Example 14: The computer-implemented method of examples 1-13, where the media call is hosted within a digital media room maintained by a social networking platform.

Example 15: The computer-implemented method of example 14, where the digital media room corresponds to a group messaging thread that includes the user and the additional users as members of the group messaging thread.

Example 16: The computer-implemented method of example 15, where the method further includes maintaining the digital media room as long as the group messaging thread is active.

Example 17: The computer-implemented method of examples 1-16, where the computer-implemented method further includes (1) streaming group content via the virtual visual surface and (2) streaming an audio stream of the group content via a speaker corresponding to a central position based on a policy to spatialize audio streams of group content as originating from a central position.

Example 18: The computer-implemented method of examples 1-17, where (1) an audio system configured to play the audio streams of the media call is a stereo system, (2) the speakers of the stereo system consist of a left speaker and a right speaker, and (3) the position of the additional user's user tile within the virtual visual surface consists of a left position or a right position.

Example 19: A system for implementing the above-described method may include at least one physical processor and physical memory that includes computer-executable instructions that, when executed by the physical processor, cause the physical processor to (1) configure, for a user participating in a media call with a group of additional users, a virtual visual surface that includes (i) an on-screen media call interface, presented within a viewable area of a display element of a device of the user, that includes a first set of user tiles, and (ii) an off-screen media call interface, positioned outside of the viewable area in a lateral direction relative to the viewable area, that includes a second set of user tiles, where each user tile within the first and second set of user tiles corresponds to a different additional user within the plurality of additional users, and (2) spatialize an audio stream of an additional user, from the group of additional users, based on a position of the additional user's user tile within the virtual visual surface.

Example 20: A non-transitory computer-readable medium may include one or more computer-readable instructions that, when executed by at least one processor of a computing device, cause the computing device to (1) configure, for a user participating in a media call with a group of additional users, a virtual visual surface that includes (i) an on-screen media call interface, presented within a viewable area of a display element of a device of the user, that includes a first set of user tiles, and (ii) an off-screen media call interface, positioned outside of the viewable area in a lateral direction relative to the viewable area, that includes a second set of user tiles, where each user tile within the first and second set of user tiles corresponds to a different additional user within the plurality of additional users, and (2) spatialize an audio stream of an additional user, from the group of additional users, based on a position of the additional user's user tile within the virtual visual surface.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device (e.g., memory device 234 and/or 236 in FIG. 2) and at least one physical processor (e.g., physical processor 238 and physical processor 240 in FIG. 2).

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
configuring, for a user participating in a media call with a plurality of additional users, a virtual visual surface comprising (1) an on-screen media call interface, presented within a viewable area of a display element of a device of the user, comprising a first set of user tiles, and (2) an off-screen media call interface, positioned outside of the viewable area, comprising a second set of user tiles, wherein:
the media call is hosted within a digital media room, maintained by a social networking platform, corresponding to a group messaging thread comprising the user and the additional users as members of the group messaging thread; and each user tile within the first and second set of user tiles corresponds to a different additional user within the plurality of additional users; and spatializing an audio stream of an additional user, from the plurality of additional users, based on a position of the additional user's user tile within the virtual visual surface.

2. The computer-implemented method of claim 1, wherein spatializing the additional user's audio stream based on the position of the additional user's user tile within the virtual visual surface comprises:

identifying the position of the additional user's user tile within the virtual visual surface; and streaming the additional user's audio stream via a speaker with a spatial assignment that corresponds to the identified position.

3. The computer-implemented method of claim 2, wherein:

the off-screen media call interface is positioned outside of the viewable area in a lateral direction relative to the viewable area;

identifying the position of the additional user's user tile within the virtual visual surface comprises determining that the additional user's user tile is assigned to the off-screen media call interface; and streaming the additional user's audio stream via the speaker with the spatial assignment that corresponds to the identified position comprises streaming the additional user's audio stream via a speaker with a spatial assignment that corresponds to the lateral direction of the off-screen media call interface.

4. The computer-implemented method of claim 3, wherein the lateral direction of the off-screen media call interface comprises a left direction.

5. The computer-implemented method of claim 4, wherein the speaker with the spatial assignment that corresponds to the lateral direction of the off-screen media call interface comprises at least one of:

a left headphone speaker;
a speaker built into a left side of the user's device; or
a speaker assigned to a left side of a room.

6. The computer-implemented method of claim 3, wherein the lateral direction of the off-screen media call interface comprises a right direction.

7. The computer-implemented method of claim 6, wherein the speaker with the spatial assignment that corresponds to the lateral direction of the off-screen media call interface comprises at least one of:

a right headphone speaker;
a speaker built into a right side of the user's device; or
a speaker assigned to a right side of a room.

8. The computer-implemented method of claim 3, further comprising:

receiving user input to view the off-screen media call interface within the viewable area in place of viewing the on-screen media call interface within the viewable area;

in response to receiving the user input:

moving the off-screen media call interface from the lateral direction into the viewable area and moving the on-screen media call interface outside the viewable area in an opposite lateral direction, such that the off-screen media call interface becomes the new on-screen media call interface and the on-screen media call interface becomes a new off-screen media call interface; and changing from (1) streaming the additional user's audio stream via the speaker with the spatial assignment that corresponds to the lateral direction of the off-screen media call interface to (2) streaming the additional user's audio stream based on a position of the additional user's user tile within the new on-screen media call interface.

9. The computer-implemented method of claim 8, wherein streaming the additional user's audio stream based on the position of the additional user's user tile within the new on-screen media call interface comprises streaming the additional user's audio stream via a speaker with a spatial assignment that corresponds to the position of the additional user's user tile within the new on-screen media call interface.

10. The computer-implemented method of claim 9, wherein:

the position of the additional user's user tile within the new on-screen media call interface comprises a lateral position within the new on-screen media call interface; and the speaker, with the spatial assignment that corresponds to the position of the additional user's user tile within the new on-screen media call interface, has a spatial assignment that corresponds to the lateral position within the new on-screen media call interface.

11. The computer-implemented method of claim 8, wherein the user input comprises lateral user swiping input.

12. The computer-implemented method of claim 1, further comprising:

detecting a dominant speaker from the plurality of additional users; and in response to detecting the dominant speaker, streaming an audio stream of the dominant speaker via a speaker corresponding to a central position.

13. The computer-implemented method of claim 12, wherein streaming the dominant speaker's audio stream via the speaker corresponding to the central position comprises simultaneously streaming the dominant speaker's audio stream via a left speaker and a right speaker.

14. The computer-implemented method of claim 1, further comprising maintaining the digital media room as long as the group messaging thread is active.

15. The computer-implemented method of claim 1, further comprising:

streaming group content via the virtual visual surface; and
streaming an audio stream of the group content via a speaker corresponding to a central position based on a policy to spatialize audio streams of group content as originating from a central position.

16. The computer-implemented method of claim 1, wherein:

an audio system configured to play the audio streams of the media call comprises a stereo system, wherein the speakers of the stereo system consist of a left speaker and a right speaker; and the position of the additional user's user tile within the virtual visual surface consists of a left position or a right position.

17. A system comprising:

at least one physical processor; and
physical memory comprising computer-executable instructions that, when executed by the physical processor, cause the physical processor to:

configure, for a user participating in a media call with a plurality of additional users, a virtual visual surface comprising (1) an on-screen media call interface, presented within a viewable area of a display element of a device of the user, comprising a first set of user tiles, and (2) an off-screen media call interface, positioned outside of the viewable area in a lateral direction relative to the viewable area, comprising a second set of user tiles, wherein:
  the media call is hosted within a digital media room, maintained by a social networking platform, corresponding to a group messaging thread comprising the user and the additional users as members of the group messaging thread; and
  each user tile within the first and second set of user tiles corresponds to a different additional user within the plurality of additional users; and
spatialize an audio stream of an additional user, from the plurality of additional users, based on a position of the additional user's user tile within the virtual visual surface.

18. The system of claim 17, wherein:
an audio system configured to play the audio streams of the media call comprises a stereo system, wherein the speakers of the stereo system consist of a left speaker and a right speaker; and
the position of the additional user's user tile within the virtual visual surface consists of a left position or a right position.

19. A non-transitory computer-readable medium comprising one or more computer-readable instructions that, when executed by at least one processor of a computing device, cause the computing device to:
  configure, for a user participating in a media call with a plurality of additional users, a virtual visual surface comprising (1) an on-screen media call interface, presented within a viewable area of a display element of a device of the user, comprising a first set of user tiles, and (2) an off-screen media call interface, positioned outside of the viewable area in a lateral direction relative to the viewable area, comprising a second set of user tiles, wherein:
    the media call is hosted within a digital media room, maintained by a social networking platform, corresponding to a group messaging thread comprising the user and the additional users as members of the group messaging thread; and
    each user tile within the first and second set of user tiles corresponds to a different additional user within the plurality of additional users; and
  spatialize an audio stream of an additional user, from the plurality of additional users, based on a position of the additional user's user tile within the virtual visual surface.

20. The non-transitory computer-readable medium of claim 19, wherein:
an audio system configured to play the audio streams of the media call comprises a stereo system, wherein the speakers of the stereo system consist of a left speaker and a right speaker; and
the position of the additional user's user tile within the virtual visual surface consists of a left position or a right position.

\* \* \* \* \*